United States Patent [19]
Foshee et al.

[11] 3,777,542
[45] Dec. 11, 1973

[54] TOOL FOR ADJUSTING TRUCK AXLE CASTER

[76] Inventors: William H. Foshee, 122 W. Pioneer, Irving, Tex.; Lester C. Jones, P.O. Box 310, Corsicana, Tex. 75110

[22] Filed: Oct. 26, 1971

[21] Appl. No.: 192,075

[52] U.S. Cl.................... 72/457, 72/316, 72/705, 72/704
[51] Int. Cl............................................ B21j 13/08
[58] Field of Search................... 72/705, 704, 389, 72/388, 305, 316, 457

[56] References Cited
UNITED STATES PATENTS

| | | | |
|---|---|---|---|
| 2,142,850 | 1/1939 | Johnston | 72/316 |
| 2,069,249 | 2/1937 | Hunt | 72/705 |
| 2,597,234 | 5/1952 | Elam | 72/705 |
| 1,273,831 | 7/1918 | Dee | 72/388 |
| 1,814,435 | 7/1931 | DeLaney | 72/705 |
| R18,714 | 1/1933 | Wochner | 72/705 |

*Primary Examiner*—Charles W. Lanham
*Assistant Examiner*—M. J. Keenan
*Attorney*—Giles C. Clegg, Jr. et al.

[57] ABSTRACT

Disclosed is a tool for correcting caster in Ford twin I-beam axle assembles. The tool is primarily an L-shaped beam adapted to be detachably secured to the rear end of the radius arm and provide a base positioning an expansion device to bond the forward end of the radius arm. A strut is also disclosed to provide means for bending the forward end of the radius arm in the opposite direction.

4 Claims, 7 Drawing Figures

PATENTED DEC 11 1973 3,777,542

TOOL FOR ADJUSTING TRUCK AXLE CASTER

This invention relates to tools for adjusting truck suspension mechanisms. More particularly, it relates to a tool for adjusting wheel caster in Ford twin I-beam truck suspension mechanisms.

The handling characteristics and usable lifetime of truck tires is dependent to a large extent on the proper alignment of the front wheels. Three major adjustments may be made to correctly align the vehicle front wheels; these are camber, caster and toe-in. Camber and toe-in are readily adjustable on most vehicles. Caster, however, is not easily adjusted on most vehicles since means for altering caster is not generally included in the mechanical design. A particular difficulty is encountered in adjusting caster on trucks equipped with the Ford twin I-beam front axle. In such vehicles, caster is determined by the angle at which each individual axle passes through the forward end of the longitudinally extending radius arm. Frequently the radius arm is not properly aligned when manufactured or becomes bent in use, resulting in improper caster of the front wheel. Since the Ford twin I-beam suspension makes no provision for adjustment of caster, the caster of such wheel usually remains improper and resulting in unsuitable handling characteristics of the truck and improper and excessive wear of the tires.

In accordance with the present invention, a tool is provided which may be used to bend the radius arm to adjust caster of the front wheel. The tool is particularly designed for use without removing the radius arm from the vehicle, thus avoiding the time consuming task of removing the radius arm to adjust caster to the degree necessary.

The tool basically comprises an L-shaped beam with means for detachably fixing the tool to the rear end of the radius arm. The tool includes a slotted beam slideable over the length of the L-shaped beam and adapted to hook over the forward end of the radius arm. The slotted beam acts as a fulcrum when hydraulic expansion means, such as a hydraulic jack or the like, is positioned between the radius arm and the L-beam to bend the radius arm in the desired direction. By bending the end of the radius arm, the angle at which the axle passes through the forward end of the radius arm can be adjusted, thereby altering caster. Since the radius arm need not be removed from the vehicle for correction, a vast saving in time is obtained. Furthermore, the apparatus may be easily attached and removed to allow adjustment in incremental amounts as desired to provide the necessary caster correction.

Other features and advantages of the invention will become more readily understood when taken in connection with the appended claims and attached drawings in which:

Figure 2A:
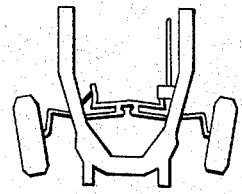
FIGS. 2a, 2b and 2c are diagrammatical representations illustrating alignment variables in front wheel suspensions.
Figure 2B:
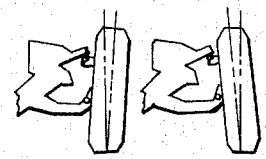
Figure 2C:
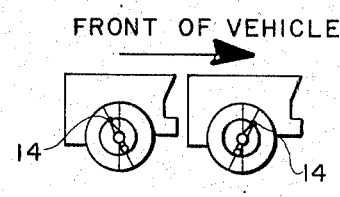

For clarity of illustration the major front wheel alignment variables are illustrated in FIG. 2. The diagrammatical representation of FIG. 2A illustrates toe-in which refers to adjustment of the wheels so that the forward sides of the wheels are closer than the rear sides of the wheels. FIG. 2B illustrates camber which refers to deviation of the wheels from vertical. FIG. 2C illustrates caster of the wheel which refers to deviation of the kingpin from vertical in the longitudinal plane. As illustrated in the left-hand portion of FIG. 2C, positive caster refers to rearward deviation of the top of the kingpin 14 from the vertical. Negative caster refers to forward deviation of the top of the kingpin 14 from vertical.

Figure 1:
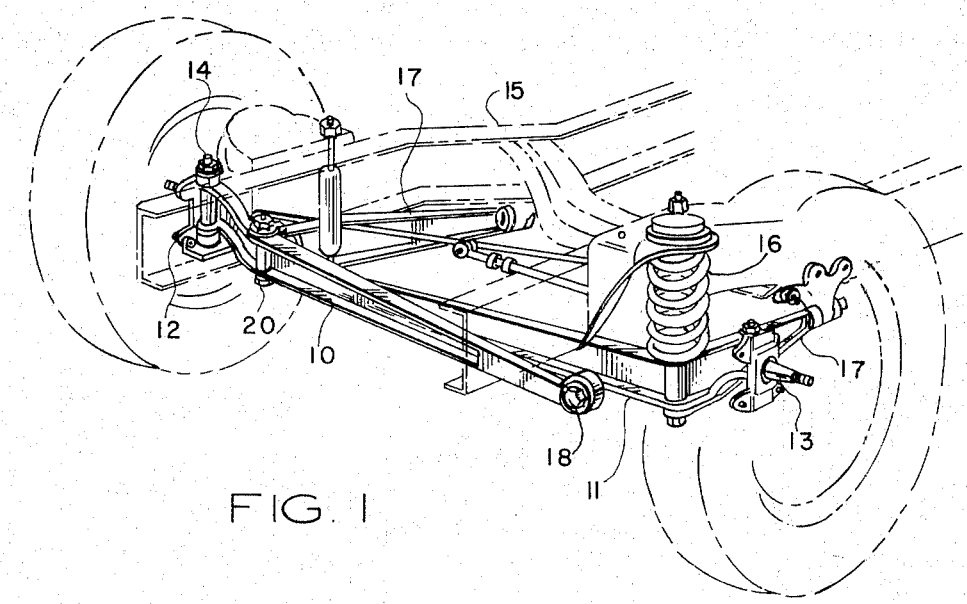
FIG. 1 is a perspective view of the usual Ford twin I-beam axle assembly.

As illustrated in FIG. 1, the Ford twin I-beam front suspension system comprises a pair of I-beam axles 10 and 11, respectively. It will be observed that the caster of spindle 12 is determined by the angle at which kingpin 14 passes through the outer end of I-beam axle 10. Each axle 10 and 11 is attached to the frame 15 of the vehicle by means of spring 16 and radius arm 17. The end of the axle 10 opposite the wheel is attached to the frame by means of a stud 18. It will thus be observed that the wheel attached to the axle 10 may move in the vertical direction but is prevented from moving in the horizontal direction by radius arm 17.

Axle 10 is attached to the forward end of radius arm 17 by means of a pin 20 passing vertically through the clevis end of the radius arm and the axle 10. Since the relationship between the kingpin 14 and pin 20 is fixed, caster of spindle 12 will be determined by the angular deviation from vertical at which pin 20 passes through axle 10. If the clevis end of the radius arm is misaligned, the kingpin will be misaligned, resulting in improper caster.

Figure 3:
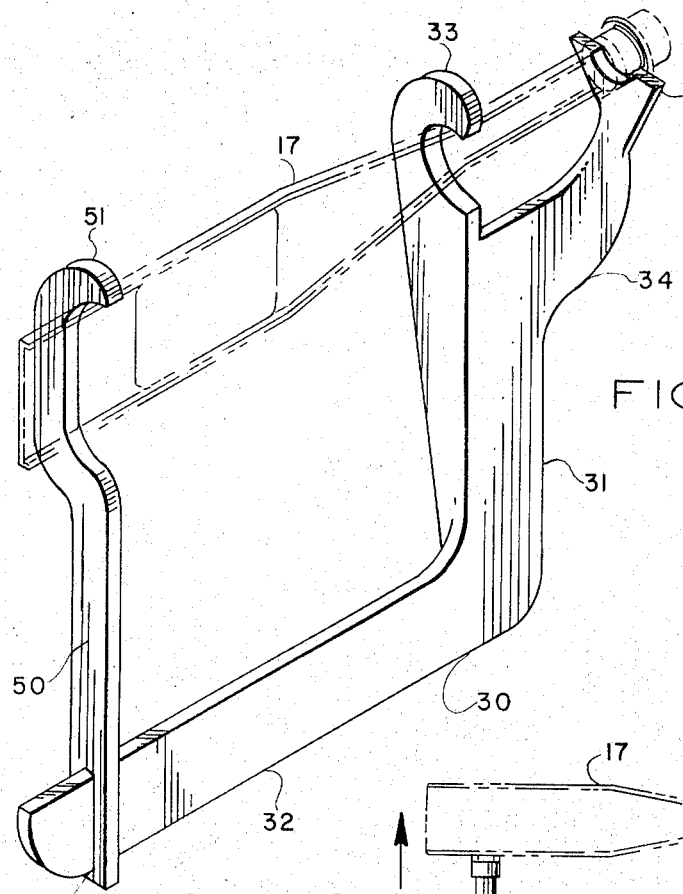
FIG. 3 is a perspective view of one embodiment of the tool of the invention.

The preferred embodiment of the invention is illustrated in FIG. 3. The tool basically comprises an L-shaped beam 30 having a vertical base arm 31 and a forwardly projecting horizontal arm 32. The base arm 31 terminates in a hook 33 adapted to hook over the radius arm 17 near the rear end thereof. The base arm 31 also includes an extension or bracing arm 34 projecting 180° from horizontal arm 32 and terminating in an upwardly extending Y-member 35 adapted to mate with the underside of the rear end of radius arm 17. It will thus be observed that Y-member 35 and hook 33 are mutually aligned in a plane parallel with the forwardly extending horizontal arm 32 so that when hook 33 is hooked over the top of the rear portion of radius arm 17 and Y-member 35 is positioned under the rear end of the radius arm 17, horizontal arm 32 will extend parallel to and spaced from radius arm 17.

Figure 4:
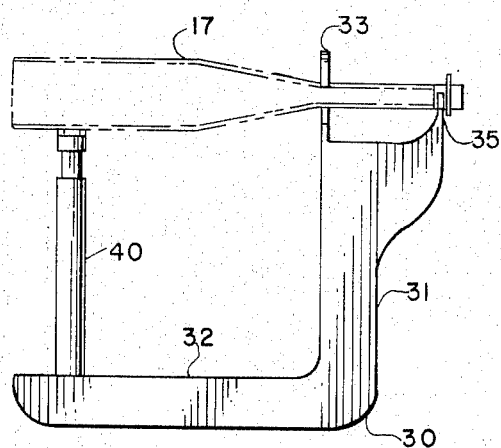
FIG. 4 is an elevational view illustrating the embodiment of FIG. 3 as used for providing positive caster.

As illustrated in FIG. 4, hydraulic expansion means such as jack 40 may be positioned between the forward end of radius arm 17 and the forward end of the horizontal arm 32. By expanding the hydraulic jack 40 the radius arm 17 will be bent upwardly as indicated by the arrow thus changing the vertical angle at which pin 30 passes through the axle. Accordingly the caster of kingpin 14 is adjusted in the positive direction. It will be observed that the positive caster may be varied as desired by bending the radius arm to the degree necessary.

Figure 5:
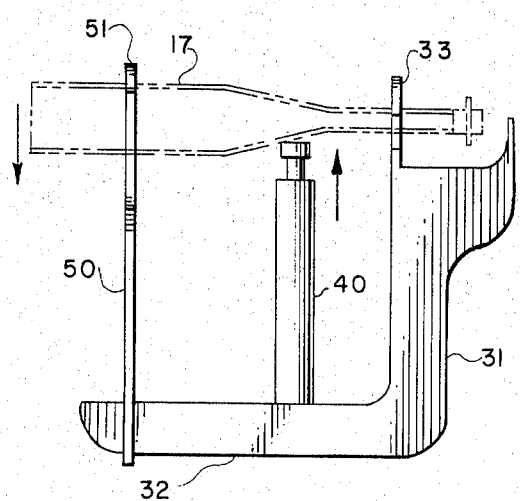
FIG. 5 is an elevational view of the device in FIG. 3 as used for providing negative caster.

To provide negative caster the forward end of the radius arm should be bent in the downward direction as illustrated in FIG. 5. Downward deviation of the forward end of the radius arm 17 may be achieved using the same tool 30 in conjunction with an additional strut 50. Strut 50 is primarily a straight bar terminating in a hook 51 in its upper end adapted to hook over the forward end of radius arm 17. Strut 50 preferably has a slot 52 in its lower end through which the horizontal arm 32 of L-beam 30 may be inserted. Strut 50 may be hooked on the radius arm 17 and slid over the forward end of horizontal arm 32 to maintain a fixed distance between horizontal arm 32 and the end of radius arm 17.

As illustrated in FIG. 5, a hydraulic expansion device such as jack 40 may be positioned between the central portion of radius arm 17 and the central portion of horizontal arm 32. Since strut 50 and base arm 31 maintain the ends of the radius arm 17 at a fixed distance from horizontal arm 32, expansion of jack 40 between the central portions of the radius arm 17 and horizontal arm 32 bends the central portion of radius arm 17 upwardly (as indicated by the arrow), resulting in an effective downward bending of the forward end of radius arm 17 with respect to the central portion thereof. Accordingly, the top of the forward end of the radius arm 17 is rotated forwardly resulting in a negative deviation in the caster.

It should be further observed that the tool of this invention may be quickly and easily attached to the radius arm while the radius arm is in place on the vehicle by simply hooking the ends of the tool over the appropriate portions of the radius arm. Pressure may be applied to either the forward end or central portion of the radius arm by a conventional hydraulic jack placed between the radius arm and the horizontal arm of the L-beam. Since the radius arm need not be removed from the vehicle for adjustment, incremental adjustment may be made and the caster checked to determine if sufficient correction has been made. If insufficient correction is made on the first incremental adjustment, the tool may be simply and quickly reattached and further adjustment made. Likewise, if overcorrection results from the first adjustment, the overadjustment can be readily removed by adjusting in the opposite direction in incremental amounts.

It will be understood that the L-shaped tool of the invention should be of sufficient rigidity and strength to withstand the pressure exerted thereon without bending. Since the radius arm is made of steel, a relatively heavy steel tool may be required.

The dimensions of the tool are not critical. However, the base arm should be long enough to permit a conventional hydraulic jack to be inserted between the horizontal arm and the radius arm. The horizontal arm should be approximately the length of the radius arm.

While the invention has been described with particular reference to a hook and laterally spaced Y-brace for attaching the tool to the radius arm, other means for attachment will be apparent to those skilled in the art. Likewise, other means for attaching the strut member to the horizontal arm may be substituted for the slot arrangement specifically described.

It is to be understood that although the invention has been described with particular reference to a specific embodiment thereof, the form of the invention shown and described in detail is to be taken as the preferred embodiment of same, and that various changes and modifications may be resorted to without departing from the spirit and scope of the invention as defined by the appended claims.

What is claimed:

1. A tool for adjusting caster in axle assemblies including an axle attached to a radius arm by a pin passing substantially vertically through one end of the radius arm and through the axle comprising:
   an L-shaped bar including a base arm, the end of which terminates in a hook adapted to mate with the top of said radius arm, a horizontal arm, and a bracing arm extending from said base arm in a direction approximately 180° from the horizontal arm, said bracing arm terminating in a Y-shaped structure adapted to mate with the underside of said radius arm, said bracing arm aligned to maintain said horizontal arm substantially parallel to and spaced from said radius arm.

2. The tool defined in claim 1 and including strut means for maintaining a fixed distance between the end of said horizontal arm and the forward end of said radius arm.

3. The tool defined in claim 2 wherein said strut means comprises an elongated bar, one end of said bar terminating in hook means adapted to engage the forward end of said radius arm and the opposite end adapted to engage said horizontal arm.

4. The tool defined in claim 3 where said opposite end adapted to engage said horizontal arm includes a slot in said bar adapted to mate with said horizontal arm.

\* \* \* \* \*